US008682568B2

(12) United States Patent
Shimo et al.

(10) Patent No.: US 8,682,568 B2
(45) Date of Patent: Mar. 25, 2014

(54) DIESEL ENGINE AND METHOD OF CONTROLLING THE DIESEL ENGINE

(75) Inventors: Daisuke Shimo, Hiroshima (JP); Kim Sangkyu, Higashihiroshima (JP); Kyotaro Nishimoto, Hiroshima (JP); Shinichi Morinaga, Hiroshima (JP); Keiji Maruyama, Hiroshima (JP); Hiroshi Minamoto, Hiroshima (JP); Masayuki Tetsuno, Hiroshima (JP); Masahiro Nagoshi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 361 days.

(21) Appl. No.: 13/170,861

(22) Filed: Jun. 28, 2011

(65) Prior Publication Data

US 2012/0004826 A1 Jan. 5, 2012

(30) Foreign Application Priority Data

Jun. 30, 2010 (JP) ................................. 2010-150027
Apr. 14, 2011 (JP) ................................. 2011-090029

(51) Int. Cl.
*F02B 3/12* (2006.01)

(52) U.S. Cl.
USPC ............ 701/105; 123/299; 123/305; 123/435

(58) Field of Classification Search
USPC .......................... 123/299, 305, 435; 701/105
See application file for complete search history.

(56) References Cited

U.S. PATENT DOCUMENTS 3,996,912 A * 12/1976 Dreisin et al. ........... 123/179.21
4,122,679 A * 10/1978 Charron .......................... 60/599
6,058,904 A * 5/2000 Kruse ........................... 123/295
6,332,447 B1 * 12/2001 Kimura et al. ................ 123/299
7,497,199 B2 * 3/2009 Canale et al. ................. 123/299
8,327,823 B2 * 12/2012 Courtoy et al. ............... 123/299
8,340,887 B2 * 12/2012 Yamaguchi et al. .......... 701/104
8,437,945 B2 * 5/2013 Haskara et al. ............... 701/105
2003/0070650 A1 * 4/2003 Ishikawa et al. .............. 123/299
2005/0274352 A1 * 12/2005 Canale et al. ................. 123/299
2006/0260585 A1 * 11/2006 Munshi et al. ................ 123/299
2007/0240675 A1 * 10/2007 Ban .............................. 123/299
2009/0151697 A1 * 6/2009 Hatano et al. ................. 123/435
2010/0312454 A1 * 12/2010 Nada et al. .................... 701/103

FOREIGN PATENT DOCUMENTS

JP 2009293383 A 12/2009

* cited by examiner

*Primary Examiner* — Erick Solis
(74) *Attorney, Agent, or Firm* — Alleman Hall McCoy Russell & Tuttle LLP

(57) ABSTRACT

A diesel engine is provided, which includes an engine body to be supplied with fuel containing diesel fuel as its main component, a geometric compression ratio being set to 15:1 or below, a fuel injection valve arranged in the engine body so as to be oriented toward a cylinder of the engine body and for directly injecting the fuel into the cylinder, and a control module for controlling a mode of injecting the fuel into the cylinder through the fuel injection valve. The control module performs a main injection where the fuel is injected to cause a main combustion mainly including a diffusion combustion and performs a plurality of pre-stage injections where the fuel is injected prior to the main injection to cause a pre-stage combustion prior to the main combustion. The control module controls the injection mode of the injections to adjust a heat release rate.

12 Claims, 8 Drawing Sheets

35 36 30 SW2 33 21 SW1 14 14b SW4 1 15 13 51a 52 51 19 18 16 12 17 22 14a 11 11a 64a 64 65a 65 63a 63 62 62a 62b SW3 31 61a 61 61b 40 41 41a 41b SW6 SW7 42 PCM 10

DIESEL ENGINE AND METHOD OF CONTROLLING THE DIESEL ENGINE

BACKGROUND

The present invention relates to a diesel engine with a low compression ratio in which its geometric compression ratio is set comparatively low.

In diesel engines mounted in automobiles, a fuel injection is performed in each of cylinders for a plurality of times during one cycle of the engine in order to, for example, reduce NOx and soot contained in exhaust gas, reduce noises or vibrations, and improve a fuel consumption and torque. For example, JP2009-293383A discloses a diesel engine with a turbocharger in which fuel injection is performed at five timings: a main injection for generating a torque, a pilot injection performed prior to the main injection so as to preheat cylinders, a pre-injection performed between the pilot injection and the main injection to suppress an ignition delay of fuel injected by the main injection, an after injection performed after the main injection so as to raise a temperature of exhaust gas, and a post injection for raising a temperature of a catalyst by directly introducing the fuel to an exhaust system subsequent to the after injection.

Meanwhile, in a diesel engine, after fuel is injected, a time lag (i.e., an ignition delay) exists before a combustion starts. When the ignition delay is long, a slope of a heat release rate (=dQ/dθ in which "Q" indicates an amount of heat and "θ" indicates a crank angle) of the combustion becomes steep and a combustion noise become louder, and thereby, an NVH performance degrades. Therefore, the ignition delay is desired to be comparatively shorter in the diesel engine. However, in an engine with a low compression ratio in which its geometric compression ratio is set to be, for example, 15:1 or lower, a temperature and a pressure are low at the end of a compression stroke, and therefore, the ignition delay tends to be extended.

SUMMARY

The present invention is made in view of the above situations, and shortens an ignition delay and improves an NVH performance in a diesel engine with a low compression ratio.

In the present invention, a temperature is raised and a pressure is increased in a cylinder of the engine by performing a pre-stage combustion prior to a main combustion, and thereby, the ignition delay for the main combustion is shortened.

According to one aspect of the invention, a diesel engine is provided, which includes an engine body to be supplied with fuel containing diesel fuel as its main component, a geometric compression ratio being set to 15:1 or below, a fuel injection valve arranged in the engine body so as to be oriented toward a cylinder of the engine body and for directly injecting the fuel into the cylinder, and a control module for controlling a mode of injecting the fuel into the cylinder through the fuel injection valve. The control module performs a main injection where the fuel is injected to cause a main combustion mainly including a diffusion combustion and performs a plurality of pre-stage injections where the fuel is injected prior to the main injection to cause a pre-stage combustion prior to the main combustion. The control module controls the injection mode of the pre-injections and the injection mode of the main injection so that a heat release rate of the main combustion starts to increase after a heat release rate of the pre-combustion starts to decrease at the same time when the heat release rate of the pre-combustion reaches a peak. Note that, here, the phrase "injection mode" includes a pattern and a timing of injecting the fuel, and an injection amount of the fuel.

According to this configuration, the engine body is set to have the comparatively low geometric compression ratio at 15:1 or below, and a temperature and a pressure within the engine body at the end of a compression stroke are low. Thereby, an ignition delay of the engine body is comparatively long. Note that, the geometric compression ratio of the engine body may be set to 12:1 or higher.

Thus, the plurality of pre-stage injections are performed prior to the main injection. Performing the pre-stage injection causes the pre-stage combustion, and a temperature and a pressure within the cylinder (i.e., in a combustion chamber) is increased. The ignition delay mainly depends on the temperature and the pressure within the cylinder and, therefore, the ignition delay is shortened as the temperature and the pressure are increased. That is, by increasing the temperature and the pressure within the cylinder by the pre-stage injections, the ignition delay for the following main combustion is shortened. As a result, a slope of the heat release rate of the main combustion does not become steep and becomes moderate, and the peak of the heat release rate is suppressed. Therefore, it is advantageous in improving an NVH performance.

Particularly, according to the above configuration, the injection modes of the pre-stage injections and the main injection are set so that the heat release rate of the main combustion starts to increase after the heat release rate of the pre-combustion starts to decrease at the same time when the heat release rate of the pre-combustion reaches the peak. That is, in a chart showing a change of the heat release rate with respect to a change of a crank angle, a minimum value exists between a relatively low bell curve of the pre-stage combustion and a relatively high bell curve of the main combustion. In other words, the bell curve peak of the heat release rate of the pre-stage combustion is generated before the heat release rate of the main combustion starts to increase. Therefore, by using the energy obtained from the pre-stage combustion, the temperature and the pressure within the cylinder are increased enough to shorten the ignition delay by the time the main combustion starts while avoiding an increase of a combustion noise by the main combustion. Thus, the injection amount by the pre-stage injections is reduced to the necessary minimum in addition to the ignition delay being shortened, and thereby, it is advantageous in improving the fuel consumption.

Here, the ignition delay exists not only for the main combustion but also the pre-stage combustion. The long ignition delay for the pre-stage combustion degrades a controllability of the pre-stage combustion. Particularly, because the pre-injection is performed during the compression stroke where the temperature and the pressure within the cylinder are not so high, a period of the pre-stage combustion is under a disadvantageous situation compared to the main combustion.

Therefore, the ignition delay for the pre-stage combustion is shortened by performing the plurality of pre-stage injections. That is, the ignition delay depends not only on the temperature and the pressure, but also an equivalent ratio, and the ignition delay is shortened as the equivalence ratio becomes higher. Here, the total injection amount by the pre-stage injections is determined based on an amount of heat required for creating a desired atmosphere (i.e., a desired temperature and pressure within the cylinder) for the main combustion. If the required total injection amount by the pre-stage injections is supplied to the cylinder by a single fuel injection, the injection period is extended and the injected fuel is dispersed at once, and thereby, an in-cylinder state becomes over lean and the ignition delay for the pre-stage combustion becomes longer. On the other hand, when the required total injection amount by the pre-stage injections is supplied by the plurality of fuel injections, the fuel is not dispersed at once because the injection amount per single pre-stage injection is reduced, the injected fuel collides with the previously injected fuel because the plurality of fuel injections are performed intermittently, and thereby, gas mixture with a high equivalence ratio can be locally generated. That is, the plurality of pre-stage injections shortens the ignition delay for the pre-combustion by creating the gas mixture with a high equivalence ratio. When the ignition delay for the pre-combustion is shortened, the timing of the pre-combustion can accurately be controlled. Thus, a robustness of the control for improving the NVH performance by a combination of the plurality of the pre-stage injections and the main injection can be improved.

According to another aspect of the invention, a diesel engine including the engine body, the fuel injection valve and the control module is provided. The control module controls the injection mode of the pre-injections and the injection mode of the main injection so that, by increasing a temperature and a pressure within the cylinder by the pre-stage combustion, an ignition delay from a start of the main injection to a start of the main combustion becomes within a range of 0.1 to 0.3 msec.

As above, the plurality of pre-stage injections are performed prior to the main injection so as to cause the pre-stage combustion as described above. As a result, the temperature and the pressure within the cylinder are increased and the ignition delay for the main combustion is shortened. Here, the injection mode of the pre-stage injection is particularly controlled so that the ignition delay is within a range of 0.1 to 0.3 msec. If the ignition delay for the main combustion becomes longer than 0.3 msec, the slope of the heat release rate of the main combustion becomes steep and the NVH performance degrades. On the other hand, if the ignition delay for the main combustion becomes shorter than 0.1 msec, a penetration of the fuel injection degrades and, thereby, a quality of mixture gas degrades and further an emission performance degrades.

The control module may control the injection modes of the pre-injections and the main injection so that the heat release rate of the pre-stage combustion reaches a peak before a top dead center on compression stroke and the main combustion starts near the top dead center on the compression stroke.

Starting the main combustion near the top dead center on the compression stroke is advantageous in improving resistance for misfire capability. In view of accurately starting the main combustion near the top dead center on the compression stroke, the shortening the ignition delay by the pre-stage combustion is extremely effective. That is, by performing the pre-stage combustion at the timing in which the heat release rate of the pre-stage combustion reaches the peak before the top dead center on the compression stroke in advance, the main combustion can stably be performed near the top dead center on the compression stroke by performing the main injection at an appropriate timing near the top dead center on the compression stroke.

Each of the pre-stage injections may be performed at a timing in which the injected fuel reaches within a cavity formed in a top surface of a piston fitted in the cylinder.

As above, the injected fuel is suppressed from dispersing outside the cavity and, thereby, gas mixture with high equivalence ratio can be created within the cavity. The gas mixture is advantageous in further stably causing the pre-stage combustion. Here, the phrase “the fuel reaches within the cavity” includes both cases in which the fuel injected by the fuel injection valve reaches directly within the cavity while the piston elevates toward the top dead center on the compression stroke, and the fuel injected by the fuel injection valve reaches, for example, a lip part of the cavity and flows outside the cavity but then reaches within the cavity by the time when the piston reaches near the top dead center on the compression stroke. That is, an advance limit of the pre-stage injection is correspondingly extended.

The diesel engine may further include a glow plug attached to the cylinder. When the engine body is below a predetermined first temperature, the control module may further operate the glow plug and, when the engine body is above the first temperature and below a predetermined second temperature, the control module may stop the glow plug and perform the plurality of pre-stage injections and the main injection. The temperature of the engine body may be determined as a temperature of an engine coolant.

That is, when the temperature of the engine body is below the predetermined first temperature, in other words, when the engine is in a cold state or an extremely cold state, the ignitability can be secured by utilizing the glow plug and the problem of, for example, the degradation of the NVH performance can be avoided. On the other hand, when the engine body is above a predetermined second temperature, in other words, when the engine is in a warmed-up state, the ignitability is secured due to the temperature in the cylinder becoming comparatively high, and the problem of, for example, the degradation of the NVH performance can be avoided. Further, when the engine is above the first temperature and below the predetermined second temperature, in other words, when the engine is in a non-warmed-up state, the temperature in the cylinder is not so high while the glow plug is stopped, and therefore, the ignitability may be the worst. Particularly, in the engine body, because the geometric compression ratio is comparatively low, the ignitability easily significantly degrades in combination with poor temperature conditions. Here, the causing the pre-stage combustion by the plurality of pre-stage injections and, thereby, the shortening of the ignition delay are extremely effective in improving the NVH performance.

The control module may determine the injection modes of the pre-stage injections and the main injection by using a model for estimating the temperature and the pressure within the cylinder at the end of the compression stroke to calculate the ignition delay based on an operating state of the engine body and environmental conditions relating to the operation of the engine body.

Alternatively, the control module may determine the injection modes of the pre-stage injections and the main injection by using a map representing a relation between a state of the temperature and the pressure within the cylinder at the end of the compression stroke and the ignition delay under the state of the temperature and the pressure based on an operating state of the engine body and environmental conditions relating to the operation of the engine body.

In the control of increasing the temperature and the pressure within the cylinder by the plurality of pre-stage injections so as to shorten the ignition delay for the main combustion, the control using the model or the map is effective in accurately determining the injection modes of the pre-stage injections and the main injection.

According to another aspect of the invention, a method of controlling a diesel engine having a cylinder to be directly supplied with fuel containing diesel fuel as its main component, a geometric compression ratio being set to 15:1 or below, is provided. Here, the controlling method performs, when the engine is in a predetermined operating state, a main injection to cause a main combustion mainly including a diffusion combustion and a pre-stage injection to cause a pre-stage combustion prior to the main combustion.

Further, the controlling method determines an injection mode of the pre-injection and an injection mode of the main injection so that a heat release rate of the main combustion starts to increase after a heat release rate of the pre-combustion starts to decrease at the same time when the heat release rate of the pre-combustion reaches a peak, performs the pre-stage injection for a plurality of times during the compression stroke according to the determined injection mode, and performs the main injection after the pre-stage injection according to the determined injection mode.

Moreover, according to another aspect of the invention, the controlling method includes determining an injection mode of the pre-injection and an injection mode of the main injection so that, by increasing a temperature and a pressure within the cylinder by the pre-stage combustion, an ignition delay from a start of the main injection to a start of the main combustion becomes within a range of 0.1 to 0.3 msec, performing the pre-stage injection for a plurality of times during the compression stroke according to the determined injection mode, and performing the main injection after the pre-stage injection according to the determined injection mode.

According to the above configurations, even in the diesel engine with the low compression ratio, by shortening the ignition delay for the main combustion by the pre-stage combustion, the NVH performance can be improved.

BRIEF DESCRIPTION OF THE DRAWINGS

FIGS. 5A to 5C show distribution frequencies of local equivalence ratios within the cylinders with injection modes different from each other, in which FIG. 5A is in the injection mode where the number of injection holes is eight and an injection is performed once, FIG. 5B is in the injection mode where the number of the injection holes is eight and the injection is performed for three times, and FIG. 5C is in the injection mode where the number of the injection holes is twelve and the injection is performed for three times.

DESCRIPTION OF THE EMBODIMENTS

Figure 1:
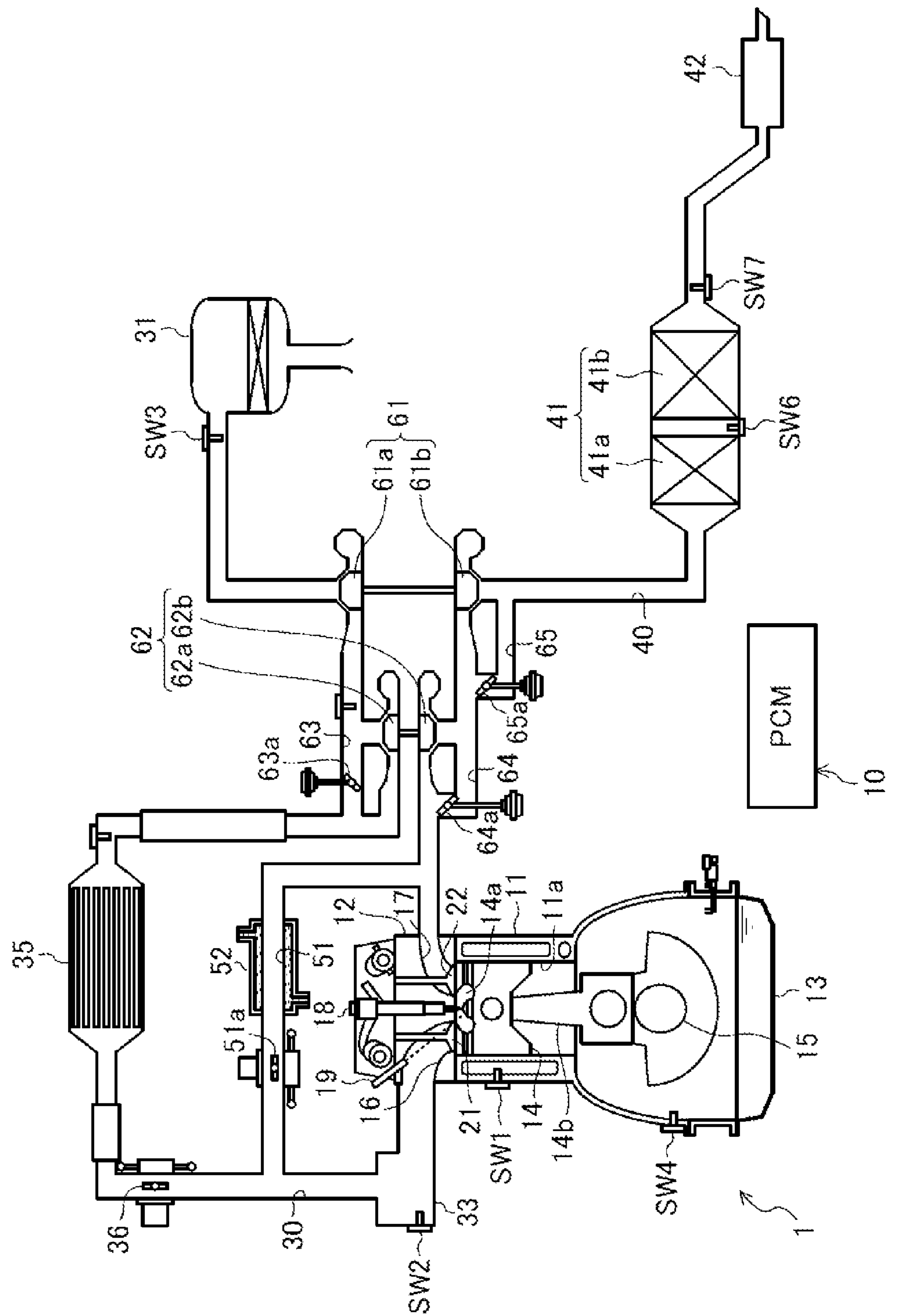
FIG. 1 is a schematic diagram showing a configuration of a diesel engine with a turbocharger according to an embodiment.
Figure 2:
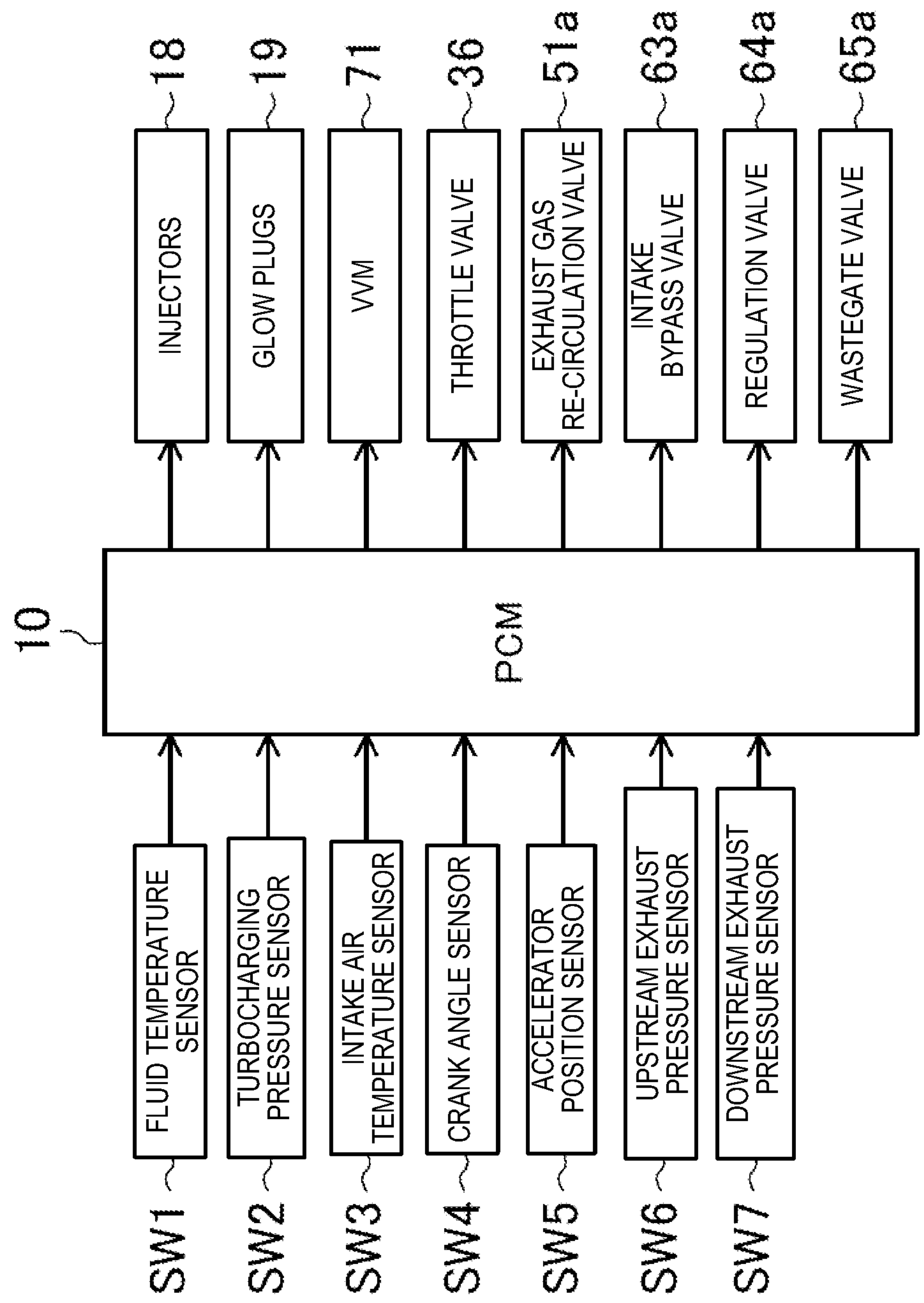
FIG. 2 is a block diagram relating to a control of the diesel engine.

Hereinafter, a diesel engine according to an embodiment of the present invention is described in detail with reference to the appended drawings. Note that, the following description of the preferred embodiment is merely an illustration. FIGS. 1 and 2 show schematic configurations of an engine (engine body) 1 of the embodiment. The engine 1 is a diesel engine that is mounted in a vehicle and supplied with fuel in which a main component is diesel fuel. The diesel engine includes a cylinder block 11 provided with a plurality of cylinders 11*a* (only one cylinder is illustrated), a cylinder head 12 arranged on the cylinder block 11, and an oil pan 13 arranged below the cylinder block 11 and where a lubricant is stored. Inside the cylinders 11*a* of the engine 1, pistons 14 are reciprocatably fitted, and cavities partially forming reentrant combustion chambers 14*a* are formed in top surfaces of the pistons 14, respectively. Each of the pistons 14 is coupled to a crank shaft 15 via a connecting rod 14*b*.

In the cylinder head 12, an intake port 16 and an exhaust port 17 are formed and an intake valve 21 for opening and closing the opening of the intake port 16 on the combustion chamber 14*a* side and an exhaust valve 22 for opening and closing the opening of the exhaust port 17 on the combustion chamber 14*a* side are arranged for each of the cylinders 11*a*.

Within a valve system of the engine 1 for operating the intake and exhaust valves 21 and 22, a hydraulically-actuated switching mechanism 71 (see FIG. 2, hereinafter, it is referred to as VVM, variable valve motion) for switching an operation mode of the exhaust valves 22 between a normal mode and a special mode is provided on the exhaust valve side. The VVM 71 (a detailed configuration is not illustrated) includes two kinds of cams with cam profiles different from each other, that is a first cam having one cam nose and a second cam having two cam noses, and a lost motion mechanism for selectively transmitting an operating state of either one of the first and second cams to the exhaust valves 22. When the lost motion mechanism transmits the operating state of the first cam to the exhaust valves 22, the exhaust valves 22 operate in the normal mode and open only once during an exhaust stroke. On the other hand, when the lost motion mechanism transmits the operating state of the second cam to the exhaust valves 22, the exhaust valves 22 operate in the special mode and open during the exhaust stroke and further during an intake stroke once each, that is the exhaust valves are opened twice.

The mode switching in the VVM 71 between the normal and special modes is performed by a hydraulic pressure applied by a hydraulic pump (not illustrated) operated by the engine. The special mode may be utilized for a control related to an internal EGR. Note that, an electromagnetically-operated valve system for operating the exhaust valve 22 by using an electromagnetic actuator may be adopted for switching between the normal and special modes. Further, the execution of the internal EGR is not limited to opening the exhaust valves 22 twice, and it may be accomplished through an internal EGR control by opening the intake valves 21 twice or through an internal EGR control where having the burnt gas to remain in the combustion chambers by setting a negative overlap period through closing both of the intake and exhaust valves 21 and 22 during the exhaust stroke or the intake stroke.

Injectors 18 for injecting the fuel and glow plugs 19 for improving an ignitability of the fuel by heating intake air when the engine 1 is in a cold state are provided within the cylinder head 12. The injectors 18 are arranged so that fuel injection ports thereof face the combustion chambers 14*a* from ceiling surfaces of the combustion chambers 14*a*, respectively, and the injectors 18 supply the fuel to the combustion chambers 14*a* by directly injecting the fuel mainly near a top dead center (TDC) in a compression stroke.

An intake passage 30 is connected to a side surface of the engine 1 so as to communicate with the intake ports 16 of the cylinders 11*a*. Meanwhile, an exhaust passage 40 for discharging the burnt gas (i.e., exhaust gas) from the combustion chambers 14*a* of the cylinders 11*a* is connected to the other side surface of the engine 1. A large turbocharger 61 and a compact turbocharger 62 for turbocharging the intake air (described in detail below) are arranged in the intake and exhaust passages 30 and 40.

An air cleaner 31 for filtrating the intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 11*a*, and downstream ends of the independent passages are connected with the intake ports 16 of the cylinders 11*a*.

A compressor 61*a* of the large turbocharger 61, a compressor 62*a* of the compact turbocharger 62, an intercooler 35 for cooling air compressed by the compressors 61*a* and 62*a*, and a throttle valve 36 for adjusting an amount of the intake air flowing into the combustion chambers 14*a* of the cylinders 11*a* are arranged in the intake passage 30 between the air cleaner 31 and the surge tank 33. The throttle valve 36 is basically fully opened; however, it is fully closed when the engine 1 is stopped so as to prevent a shock.

A part of the exhaust passage 40 on the upstream side is constituted with an exhaust manifold having independent passages branched toward the cylinders 11*a* and connected with outer ends of the exhaust ports 17 and a merging part where the independent passages merge together.

In a part of the exhaust passage 40 on the downstream of the exhaust manifold, a turbine 62*b* of the compact turbocharger 62, a turbine 61*b* of the large turbocharger 61, an exhaust emission control device 41 for purifying hazardous components contained in the exhaust gas, and a silencer 42 are arranged in this order from the upstream.

The exhaust emission control device 41 includes an oxidation catalyst 41*a* and a DPF 41*b*, and these components are arranged in this order from the upstream. The oxidation catalyst 41*a* and the DPF 41*b* are accommodated in a case. The oxidation catalyst 41*a* has an oxidation catalyst carrying, for example, platinum or platinum added with palladium and promotes a reaction generating $CO_2$ and $H_2O$ by oxidizing CO and HC contained in the exhaust gas. The oxidation catalyst 41*a* configures a catalyst having an oxidative function. The DPF 41*b* is a filter that catches PM (Particle Matter) such as soot contained in the exhaust gas from the engine 1, and is of, for example, a wall flow type filter made of a heat resistant ceramic material, such as silicon carbide (SiC) or cordierite, or a filter having a three dimensional mesh structure made of heat resistant ceramic fiber. Note that the DPF 41*b* may be coated with the oxidation catalyst.

A part of the intake passage 30 between the surge tank 33 and the throttle valve 36 (i.e., a part downstream of the compact compressor 62*a* of the compact turbocharger 62) and a part of the exhaust passage 40 between the exhaust manifold and the compact turbine 62*b* of the compact turbocharger 62 (i.e., a part upstream of the compact turbine 62*b* of the compact turbocharger 62) are connected with an exhaust gas re-circulation passage 51 for partially re-circulating the exhaust gas to the intake passage 30. An exhaust gas re-circulation valve 51*a* for adjusting a re-circulation amount of the exhaust gas to the intake passage 30, and an EGR cooler 52 for cooling the exhaust gas by an engine coolant are arranged in the exhaust gas re-circulation passage 51.

The large turbocharger 61 has the large compressor 61*a* arranged in the intake passage 30 and the large turbine 61*b* arranged in the exhaust passage 40. The large compressor 61*a* is arranged in the intake passage 30 between the air cleaner 31 and the intercooler 35. The large turbine 61*b* is arranged in the exhaust passage 40 between the exhaust manifold and the oxidation catalyst 41*a*.

The compact turbocharger 62 has the compact compressor 62*a* arranged in the intake passage 30 and the compact turbine 62*b* arranged in the exhaust passage 40. The compact compressor 62*a* is arranged in the intake passage 30 on the downstream of the large compressor 61*a*. The compact turbine 62*b* is arranged in the exhaust passage 40 on the upstream of the large turbine 61*b*.

That is, the large compressor 61*a* and the compact compressor 62*a* are arranged in series in the intake passage 30 in this order from the upstream, and the compact turbine 62*b* and the large turbine 61*b* are arranged in series in the exhaust passage 40 in this order from the upstream. The large and compact turbines 61*b* and 62*b* are rotated by the flow of the exhaust gas, and the large and compact compressors 61*a* and 62*a* coupled with the large and compact turbines 61*b* and 62*b* are actuated by the rotations of the large and compact turbines 61*b* and 62*b*, respectively.

The compact turbocharger 62 is smaller and the large turbocharger 61 is larger in relation to each other. That is, inertia of the large turbine 61*b* of the large turbocharger 61 is larger than that of the compact turbine 62*b* of the compact turbocharger 62.

A small intake bypass passage 63 for bypassing the small compressor 62*a* is connected with the intake passage 30. A small intake bypass valve 63*a* for adjusting an amount of the air flowing into the small intake bypass passage 63 is arranged in the small intake bypass passage 63. The small intake bypass valve 63*a* is fully closed (i.e., normally closed) when no electric power is distributed thereto.

A small exhaust bypass passage 64 for bypassing the small turbine 62*b* and a large exhaust bypass passage 65 for bypassing the large turbine 61*b* are connected with the exhaust passage 40. A regulation valve 64*a* for adjusting an amount of the exhaust gas flowing to the small exhaust bypass passage 64 is arranged in the small exhaust bypass passage 64, and a wastegate valve 65*a* for adjusting an exhaust gas amount flowing to the large exhaust bypass passage 65 is arranged in the large exhaust bypass passage 65. The regulation valve 64*a* and the wastegate 65*a* are both fully opened (i.e., normally opened) when no electric power is distributed thereto.

The diesel engine 1 with the configuration described as above is controlled by a powertrain control module 10 (herein after, may be referred to as PCM). The PCM 10 is configured by a CPU, a memory, a counter timer group, an interface, and a microprocessor with paths for connecting these units. As shown in FIG. 2, the PCM 10 is inputted with detection signals from a fluid temperature sensor SW1 for detecting a temperature of the engine coolant, a turbocharging pressure sensor SW2 attached to the surge tank 33 and for detecting a pressure on the air to be supplied to the combustion chambers 14*a*, an intake air temperature sensor SW3 for detecting a temperature of the intake air, a crank angle sensor SW4 for detecting a rotational angle of the crank shaft 15, an accelerator position sensor SW5 for detecting an accelerator opening amount corresponding to an angle of an acceleration pedal (not illustrated) of the vehicle, an upstream exhaust pressure sensor SW6 for detecting a pressure on the exhaust gas on the upstream of the DPF 41*b*, and a downstream exhaust pressure sensor SW7 for detecting a pressure on the exhaust gas on the downstream of the DPF 41*b*. The PCM 10 performs various kinds of calculations based on these detection signals so as to determine the states of the engine 1 and the vehicle, and further outputs control signals to the injectors 18, the glow plugs 19, the VVM 71 of the valve system, and the actuators of the valves 36, 51*a*, 63*a*, 64*a* and 65*a* according to the determined states.

Thus, the engine 1 is configured to have a comparatively low compression ratio in which its geometric compression ratio is within a range of 12:1 to below 15:1, and thereby, the exhaust emission performance and a thermal efficiency are improved. The large and small turbochargers 61 and 62 increase a torque of the engine 1 so as to compensate for the power that is lost by the lowered geometric compression ratio.

(Description of Combustion Control of the Engine)

In the basic control of the engine 1 by the PCM 10, a target torque (i.e., target load) is determined mainly based on the engine speed and the accelerator opening amount, and an injection amount and an injection timing of the fuel corresponding to the target torque is realized by controlling the actuations of the injectors 18. The target torque is set larger as the accelerator opening amount becomes larger or the engine speed becomes higher. The injection amount of the fuel is set based on the target torque and the engine speed. The injection amount is set larger as the target torque becomes larger or the engine speed becomes higher.

Further, the PCM 10 controls a re-circulation ratio of the exhaust gas to the cylinders 11*a* by controlling the opening angles of the throttle valve 36 and the exhaust gas re-circulation valve 51*a* (i.e., external EGR control) and controlling the VVM 71 (i.e., internal EGR control).

Figure 3:
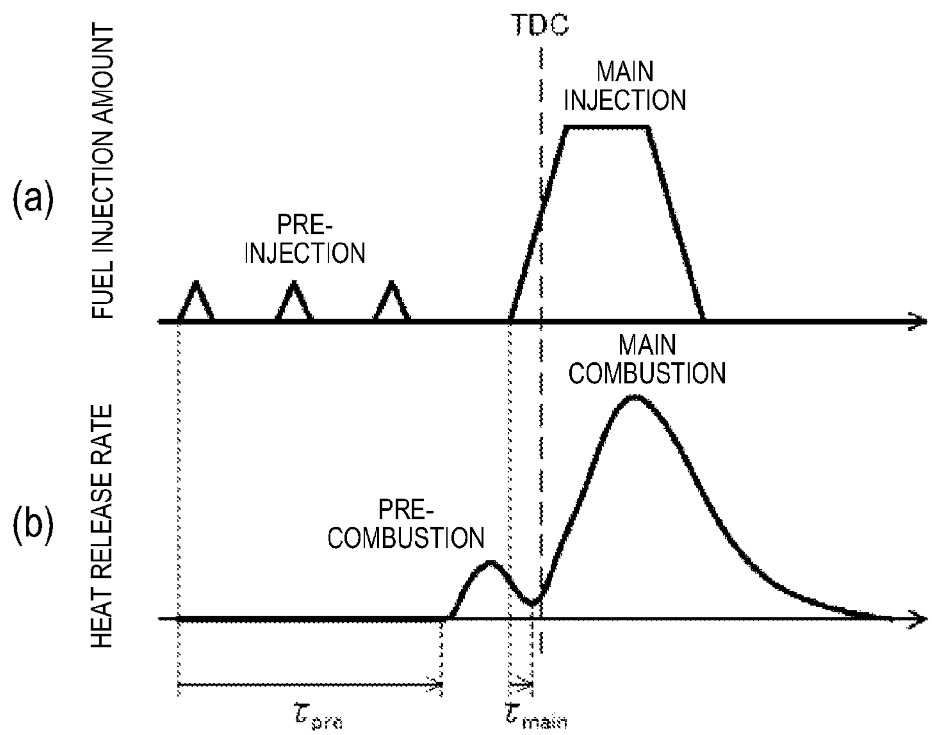
FIG. 3 is charts, in which a part (a) is a chart showing an example of the fuel injection mode within a predetermined operating range when the engine is in a non-warmed-up state and a part (b) is a chart showing an example of a history of a heat release rate in cylinders corresponding to the fuel injection mode.

In FIG. 3, the part (a) is a chart showing a fuel injection mode of the engine 1 in a non-warmed-up state and the part (b) is a chart showing an example of a history of a heat release rate in the cylinders 11*a* corresponding to the fuel injection mode. As described above, the engine 1 has the low compression ratio, and therefore, a temperature and a pressure within the engine 1 at the end of a compression stroke are comparatively low and an ignition delay tends to be long. When the engine 1 is in warming up and the temperature of the engine 1 is comparatively low, the ignition delay is further extended and a combustion noise becomes louder, and thereby, an NVH performance may degrade. Thus, a characteristic pre-combustion is performed prior to the main combustion so that the ignition delay is shortened.

Firstly, the PCM 10 determines whether the engine 1 is in a warmed-up state, a cold state, or the non-warmed-up state based on the detection result by the liquid temperature sensor SW1. Specifically, the PCM 10 determines that the engine 1 is in the cold state when the engine coolant temperature is below a predetermined first temperature (e.g., 40° C.). The PCM 10 determines that the engine 1 is in the warmed-up state when the engine coolant temperature is a predetermined second temperature (e.g., 80° C.) or above. Therefore, when the engine coolant temperature is within a range of the first temperature to below the second temperature (e.g., 40 to 80° C.), the engine is determined to be in the non-warmed-up state (i.e., in the middle of warming up). When the engine 1 is in the cold state, the glow plugs 19 are actuated. On the other hand, when the engine 1 is in the warmed-up state or the non-warmed-up state, the glow plugs 19 are stopped. Further, when the engine 1 is in the non-warmed-up state and a predetermined operating condition, the PCM 10 performs a pre-injection three times at timings comparatively close to the TDC in the compression stroke with comparatively short time intervals and further performs a main injection once near the TDC in the compression stroke as shown in FIG. 3. That is, the total of four fuel injections are performed. Each of the pre-injections corresponds to a pre-stage injection. The three pre-injections are performed to cause the pre-combustion (corresponding to a pre-stage combustion) with a sufficient heat release rate so that a peak of the heat release rate is generated at a predetermined timing before the TDC in the compression stroke. Thereby, the in-cylinder temperature and the pressure are increased before the TDC in the compression stroke prior to the main injection. Then, when the main injection is performed near the TDC (specifically, immediately before the TDC) in the compression stroke, the main combustion starts near the TDC in the compression stroke accompanied by a short ignition delay $\tau_{main}$. Here, the ignition delay $\tau_{main}$ for the main combustion is defined in an example shown in FIG. 3, as a range from when the main injection starts to when a heat release rate of the main combustion starts to increase. Further here, the injection modes of the pre-injections and the main injection are set so that the heat release rate of the main combustion starts to increase after the heat release rate of the pre-combustion starts to decrease at the same time when the heat release rate of the pre-combustion reaches its peak (described in detail below), and a minimum value of the heat release rates exist between the bell curves of the pre-combustion and the main combustion. The ignition delay $\tau_{main}$ for the main combustion may be defined as a range from when the main injection starts to the point of the minimum value.

Thereby, by surely increasing the in-cylinder temperature and the pressure prior to the main injection, the ignition delay $\tau_{main}$ for the main combustion can be shortened by the pre-combustion and the main combustion can be performed at a desired timing. Further, by shortening the ignition delay $\tau_{main}$, the increase of the heat release rate of the main combustion is reduced. Thus, avoiding the rapid increase of the heat release rate decreases the combustion noise and is advantageous in improving the NVH performance.

Figure 4:
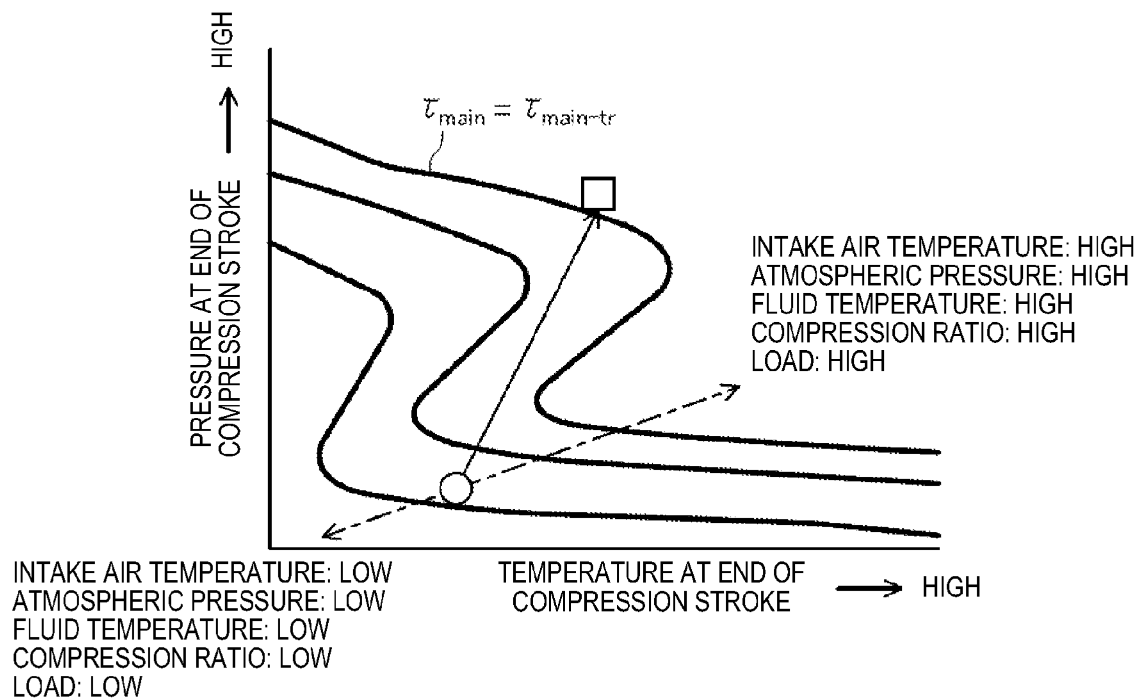
FIG. 4 is an example of a contour chart relating to an ignition delay on a temperature-pressure plane in which a temperature and a pressure at the end of a compression stroke are utilized as parameters.

Hereinafter, a relation between the pre-combustion and the ignition delay for the main combustion is described in detail with reference to the drawings. FIG. 4 shows an example of a contour chart including isochrone lines made by connecting points of temperature-pressure states in which the ignition delay is constant on a temperature-pressure plane where the vertical axis indicates the in-cylinder temperature (specifically, the temperature at the end of the compression stroke) and the lateral axis indicates the in-cylinder pressure (specifically, the pressure at the end of the compression stroke), based on a result of a simulation in which the in-cylinder compression ignition (specifically, self ignition in a low temperature) phenomenon is analyzed using a chemical reaction simulation software. In this contour chart, the isochrone lines shift rightward or upward as the ignition delay becomes shorter, and further, the isochrone lines shift according to a change of a local equivalence ratio ø. It will be appreciated that the equivalence ratio may be generally defined as the ratio of the fuel-to-oxidizer ratio to the stoichiometric fuel-to-oxidizer ratio. Specifically, the isochrone lines shift rightward or upward as the local equivalence ratio becomes lower and the ranges on the left of or below the respective isochrone lines accordingly become larger, and the isochrone lines shift leftward or downward as the local equivalence ratio becomes higher and the ranges on the left of or below the respective isochrone lines accordingly become smaller.

For example, in the contour chart shown in FIG. 4, when assuming the most upper right isochrone line is 0.2 msec, the ignition delay is shorter than 0.2 msec when the in-cylinder temperature-pressure state is within a range on the right of or above the isochrone line of 0.2 msec (e.g., the white square in FIG. 4), and, on the other hand, the ignition delay is longer than 0.2 msec when the in-cylinder temperature-pressure state is within a range on the left of or below the isochrone line (e.g., the white circle in FIG. 4).

The state indicated by the white circle in FIG. 4 is an example of the temperature and the pressure at the end of the compression stroke when the pre-combustion is not performed. This state corresponds to the temperature and the pressure at the end of the compression stroke while the engine is under motoring. The white circle is located on a comparatively left and low part in FIG. 4 and indicates that the ignition delay is comparatively long due to the geometric compression ratio of the engine 1 being set within a comparatively low value range of 12:1 to 15:1. Thereby, the combustion noise by the main combustion becomes louder and the NVH performance degrades.

Therefore, in order to shorten the ignition delay of the fuel injected by the main injection and improve the controllability of the main combustion and the NVH performance, the in-cylinder temperature-pressure state at the time when the main injection starts is required to be within the range on the right of and above the isochrone line of, for example, 0.2 msec as indicated by the white square in FIG. 4.

The pre-combustion shifts the state from where the white circle is to where the white square is corresponding to the increases of the in-cylinder temperature and pressure. In other words, the pre-combustion is for shifting the state inside the cylinders by crossing the isochrone lines from the range on the left of and below the desired isochrone line to the range on the right of and above the desired isochrone line as indicated by the solid line arrow in FIG. 4. The length of the arrow drawn in solid line in FIG. 4 corresponds to an amount of heat generated by the pre-combustion. The ignition delay $\tau_{main}$ for the main combustion is preferably set within a range of 0.1 to 0.3 msec ($=\tau_{main-tr}$). The ignition delay longer than 0.3 msec causes a steep slope of the heat release rate of the main combustion and degrades the NVH performance. On the other hand, the ignition delay shorter than 0.1 msec degrades a penetration of the fuel injection, and thereby, a quality of gas mixture degrades and further an emission performance degrades.

Here, the temperature and the pressure at the end of the compression stroke while the engine is under motoring depend not only on the geometric compression ratio, but also change according to environmental conditions relating to the operation of the engine 1, such as an intake air temperature, the atmospheric pressure (or an intake air pressure), the engine coolant temperature, an effective compression ratio and the engine load. Specifically, the temperature and the pressure at the end of the compression stroke while the engine is under motoring (the white circle in FIG. 4) shift rightward and/or upward as the intake air temperature becomes higher, the atmospheric pressure (or the intake air pressure) becomes higher, the engine coolant temperature becomes higher, the effective compression ratio becomes higher, or the engine load becomes higher. On the other hand, the temperature and the pressure at the end of the compression stroke while the engine is under motoring (the white circle in FIG. 4) shift leftward and/or downward as the intake air temperature becomes lower, the atmospheric pressure (or the intake air pressure) becomes lower, the engine coolant temperature becomes lower, the effective compression ratio becomes lower, or the engine load becomes lower. Therefore, the ignitability degrades as the location within the chart shifts leftward and downward because the location of the temperature and the pressure at the end of the compression stroke shifts further from the desired isochrone line. As a result, the heat amount required for the pre-combustion increases.

Performing the three divided pre-injections improves the ignitability of the fuel injected by the pre-injections and, thereby, improves the controllability of the pre-combustion. That is, a total injection amount by the pre-injections is determined based on the heat amount desired to be generated by the pre-combustion. If the required total injection amount is supplied to the cylinders 11*a* by a single pre-injection, the fuel is dispersed at once and an equivalence ratio of the mixture gas is lowered. As a result, an ignition delay $\tau_{pre}$ for the pre-combustion is extended (see the part (b) in FIG. 3). On the other hand, by injecting the required total injection amount by performing three separate pre-injections, the injection amount per single pre-injection is reduced. Thus, the fuel is suppressed from being dispersed and the mixture gas with high equivalence ratio (e.g., the ratio within the range of 1:1 to 3:1) is locally generated by intermittently injecting the small amount of fuel. Therefore, the ignition delay $\tau_{pre}$ for the pre-combustion can be shortened by creating the mixture gas with high equivalence ratio. When the ignition delay $\tau_{pre}$ for the pre-combustion is shortened, a timing of the pre-combustion can accurately be controlled. That is, the pre-combustion can be controlled so that the peak of the heat release rate thereof is generated accurately at the predetermined timing before the TDC in the compression stroke. As a result, the main combustion can stably be started at the desired timing. The ignition delay $\tau_{pre}$ for the pre-combustion is preferably set to be 1.5 msec or shorter. Thereby, the peak of the heat release rate of the pre-combustion can further surely be generated before the TDC in the compression stroke and becomes advantageous in improving the controllability of the main combustion.

Figure 5C:
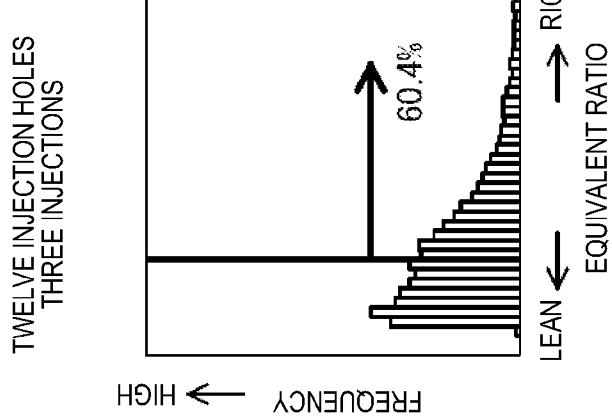
Figure 5B:
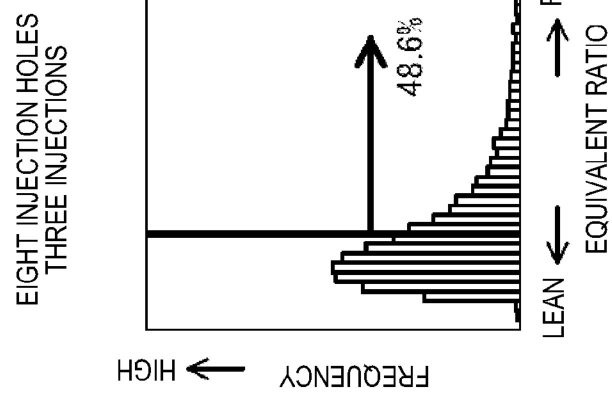
Figure 5A:
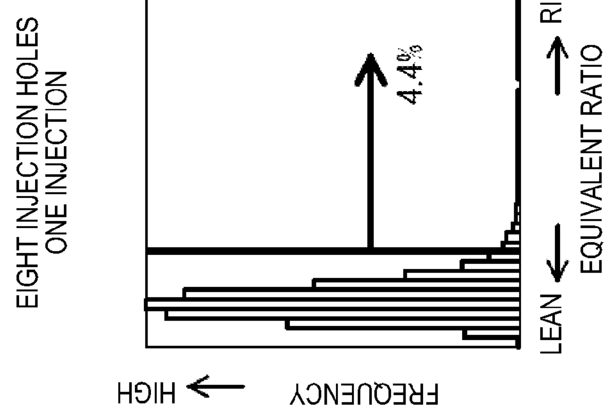

FIGS. 5A to 5C show distribution frequencies of the local equivalence ratios within the cylinders 11*a* with injection modes different from each other. FIG. 5A shows the distribution frequency of the local equivalence ratio when the number of the total injection holes of the injectors 18 is eight and the injection is performed only once. The frequency of the local equivalence ratio ø being 1:1 or higher is low at 4.4%. In this case, the quality of the ignitability is low and the ignition delay is long. Further, for obtaining the desired heat amount, the fuel injection amount is required to be increased because of the low ignitability.

FIG. 5B shows the distribution frequency of the local equivalence ratio when the injection is performed three times by the eight injection holes. The frequency of the local equivalent ratio ø being 1:1 or higher is 48.6%, and the ignitability is improved by increasing the number of the injections. That is, it can be conceived that because the injection amount per injection is reduced and the fuel is injected intermittently; the injected fuel is mixed with the fuel previously injected in a manner such that they collide with each other and the equivalence ratio is locally increased.

FIG. 5C shows the distribution frequency of the local equivalence ratio when the number of the total injection holes of the injectors 18 is increased to twelve and the injection is performed three times. In this case, the frequency of the local equivalence ratio ø being 1:1 or higher is 60.4%, thereby the ignitability is improved also by increasing the injection holes, Thereby, an increase in the number of the injections is further advantageous in view of increasing the local equivalence ratio by the pre-injection so as to improve the controllability of the pre-combustion; however, it is expected that if the number of the pre-injections is too large, enough time intervals between the injections cannot be obtained and the equivalence ratio does not sufficiently increase. Therefore, the number of the pre-injections is preferably about three at a maximum. Further, an increase in the number of the injection holes of the injectors 18 is further advantageous in view of increasing the local equivalence ratio by the pre-injection so as to improve the controllability of the pre-combustion; however, because the reaching distance of the injection becomes shorter as the number of the injection holes becomes larger due to the smaller diameter of each of the holes, the number of the injection holes of the injectors is preferably between eight to twelve.

In each of the cylinders, the plurality of pre-injections are performed at timings in which all of the fuel injected by each pre-injection reaches within the cavity, that is within the combustion chamber 14*a*. The timings include the timing where the fuel injected by the injector 18 reaches directly within the cavity while the piston 14 elevates toward the TDC on the compression stroke, and the timing where the fuel injected by the injector 18 reaches, for example, a lip part of the cavity and flows outside the cavity but then flows into the cavity by the time when the piston 14 reaches near the TDC in the compression stroke. Thereby, all the mixture gas with high equivalence ratio, which is locally generated, flows into the cavity, the ignition delay $\tau_{pre}$ for the pre-combustion is further shortened, and the controllability of the pre-combustion is further improved.

Figure 6:
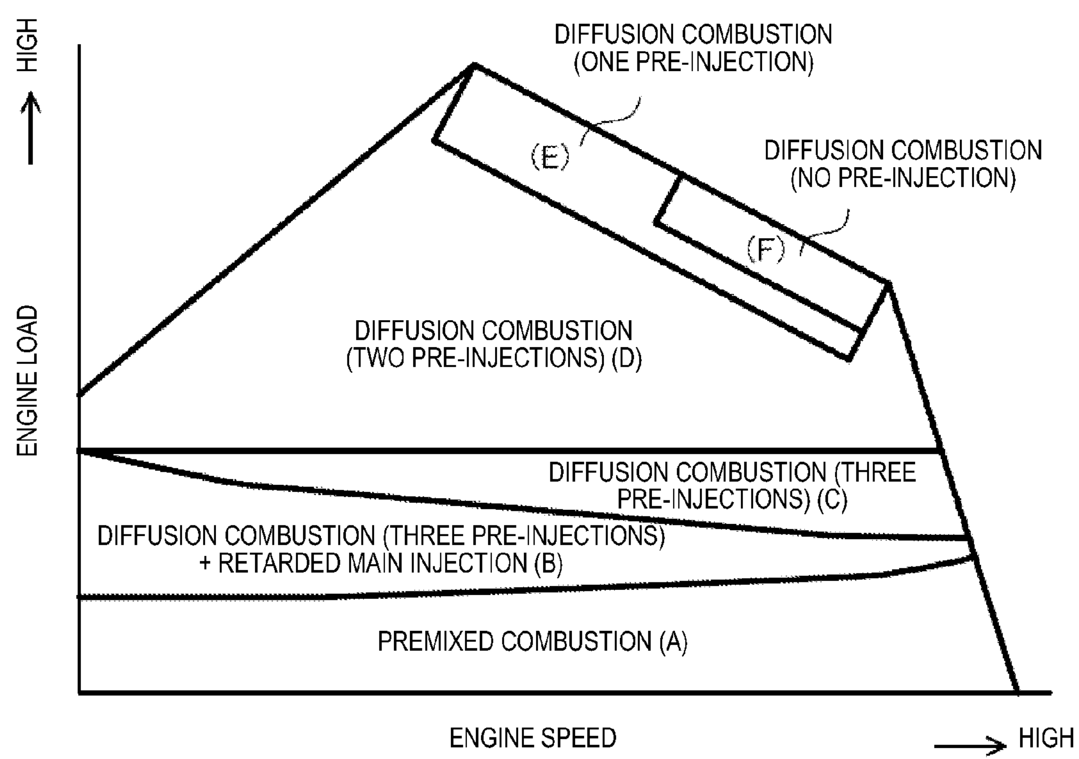
FIG. 6 is an example of a fuel injection map when the engine is in a non-warmed-up state.

FIG. 6 is a map showing combustion modes according to the operating state of the engine 1 in a normal condition when the engine 1 is in the non-warmed-up state. An operating range C (a diffusion combustion (three pre-injections)) near a middle load in the map corresponds to the fuel injection mode shown in FIG. 3. Within the operating range C, the pre-injection is performed three times as described above, and thereby, the peak of the heat release rate of the pre-combustion is generated before the TDC in the compression stroke as indicated by the part (b) in FIG. 3. Therefore, by setting the timing of the main injection to an appropriate timing near the TDC in the compression stroke under an in-cylinder environment where the ignition delay $\tau_{main}$ is shortened by increasing the in-cylinder temperature and the pressure, the main combustion can be started accurately near the TDC in the compression stroke. Thereby, the fuel consumption and resistance for misfire capability can be improved. Further, the slope of the heat release rate of the main combustion becomes moderate and the NVH performance improves due to the shortened ignition delay. The state of the cylinders 11*a* here is indicated by a contour chart in FIG. 7 as an example. Here, in consideration of the robustness of the control, the temperature and the pressure at the end of the compression stroke is sufficiently increased by the pre-combustion from the state under motoring (see the white circle in FIG. 7), and thereby, the ignition delay $\tau_{main}$ is adjusted to be shorter than a target ignition delay $\tau_{main\text{-}tr}$ (see the white square in FIG. 7).

Figure 7:
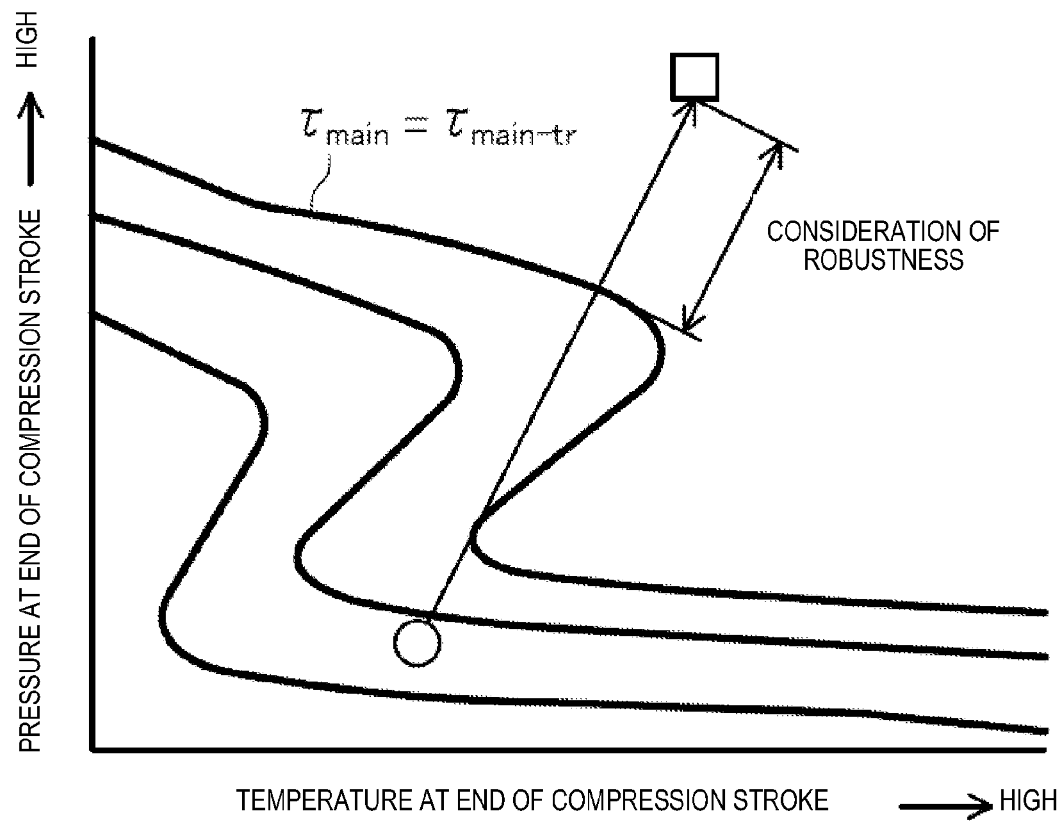
FIG. 7 is a chart showing a function of the pre-injection in the fuel injection mode shown in FIG. 3 by using a contour chart relating to an ignition delay.
Figure 8:
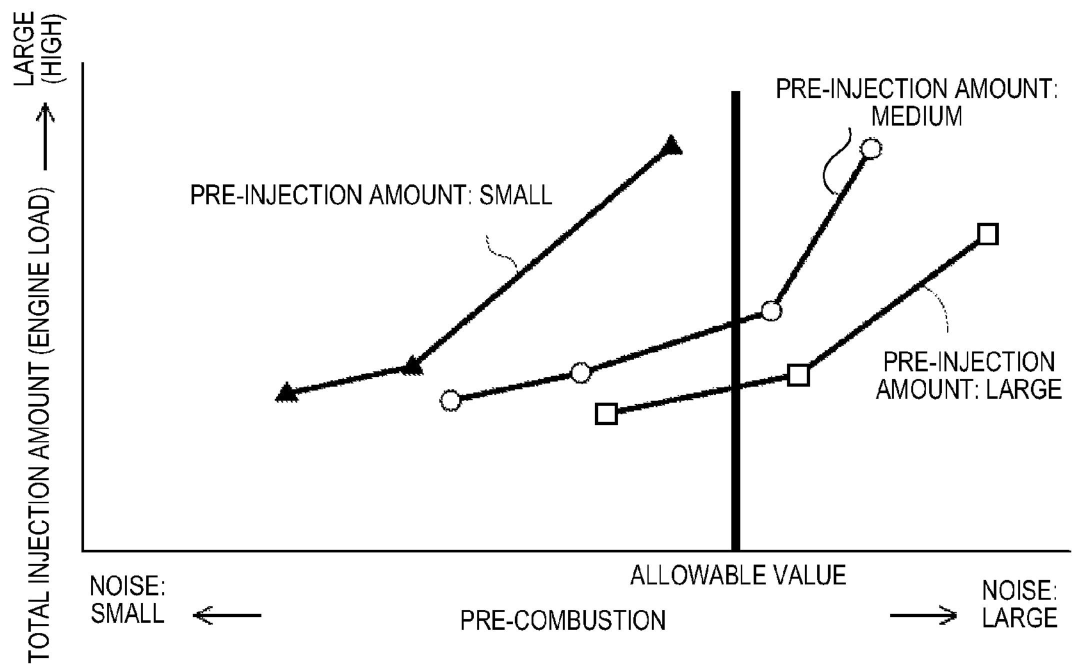
FIG. 8 is a chart showing relations between a parameter relating to a noise by the pre-combustion and a total injection amount when a pre-injection amount is differentiated.

Hereinafter, a preferable setting of the injection amount by the pre-injection is described in detail with reference to FIG. 8. FIG. 8 is a chart showing relations between a parameter (e.g., dP/dθ) relating to a noise by the pre-combustion (lateral axis) and a total injection amount by the injections including the pre-injection and the main injection (vertical axis), and the three lines have pre-injection amounts different from each other. In FIG. 8, the combustion noise (noise) by the pre-combustion becomes louder toward right and becomes quieter toward left. The thick vertical solid line in FIG. 8 is a maximum allowable value of the combustion noise, and a range on the left of the value is a range where the combustion noise is allowable. Each of the lines has characteristics of rising rightward and upward and indicates the combustion noise by the pre-combustion is louder as the total injection amount is larger. Further, when comparing different pre-injection amounts while keeping the total injection amount the same, the combustion noise by the pre-combustion is louder as the pre-injection amount is larger. Therefore, as shown in FIG. 7 and the like, a minimum value of the pre-injection amount may be set based on the heat amount required for the temperature and the pressure at the end of the compression stroke to move to exceed the state of the target ignition delay $\tau_{main}$ from the state at the time of the motoring, and a maximum value of the pre-injection amount in consideration of the robustness may be determined within a range where the combustion noise by the pre-combustion does not exceed the allowable value.

In the map of FIG. 6, within an operating range D where the engine load is higher than within the operating range C, the number of the pre-injections is reduced to be twice. That is, the total number of the pre-injections combined with the main injection is three. The in-cylinder temperature and pressure increase corresponding to the higher engine load, and the ignition delay of the fuel injected by the pre-injections tends to be shorter (see the dashed line arrow extending rightward and upward in FIG. 4). Therefore, the pre-combustion can be performed while being accurately controlled even when the number of the pre-injections is reduced, and thereby, the ignition delay for the main combustion can be shortened.

Within an operating range E where the engine load is high (including a full engine load range), the number of the pre-injections is reduced to one and the total number of the pre-injection combined with the main injection is two. Thus, both the fuel consumption and the NVH performance are improved. Further, within an operating range F where the engine speed is relatively high within the full engine load range, the pre-injection is omitted and only the main injection is performed.

Within the range A where the engine load is low, instead of the main combustion mainly including a diffusion combustion, a premixed combustion is performed without the main injection. In an injection mode of the premixed combustion (not illustrated), the fuel is injected into the cylinders 11*a* at a comparatively early timing during the compression stroke and the fuel injection is completed before the fuel ignites. The fuel injection is performed, for example, a plurality of times by dividing the total fuel injection amount. The fuel injection amount that is injected at a relatively early timing may relatively be larger and the fuel injection amount that is injected at a relatively late timing may relatively be smaller in the divided injections. Injecting as much fuel as possible in the early stage improves a premixture level of the fuel. The injected fuel thus self-ignites near the TDC in the compression stroke in a state where the fuel is sufficiently mixed with air and combusts. In the premixed combustion, an atmosphere where the fuel is mixed uniformly can be generated prior to the ignition of the fuel and, thereby, incomplete combustion of the fuel and the generation of the soot are suppressed while having comparatively low fuel to air ratio.

Figure 9:
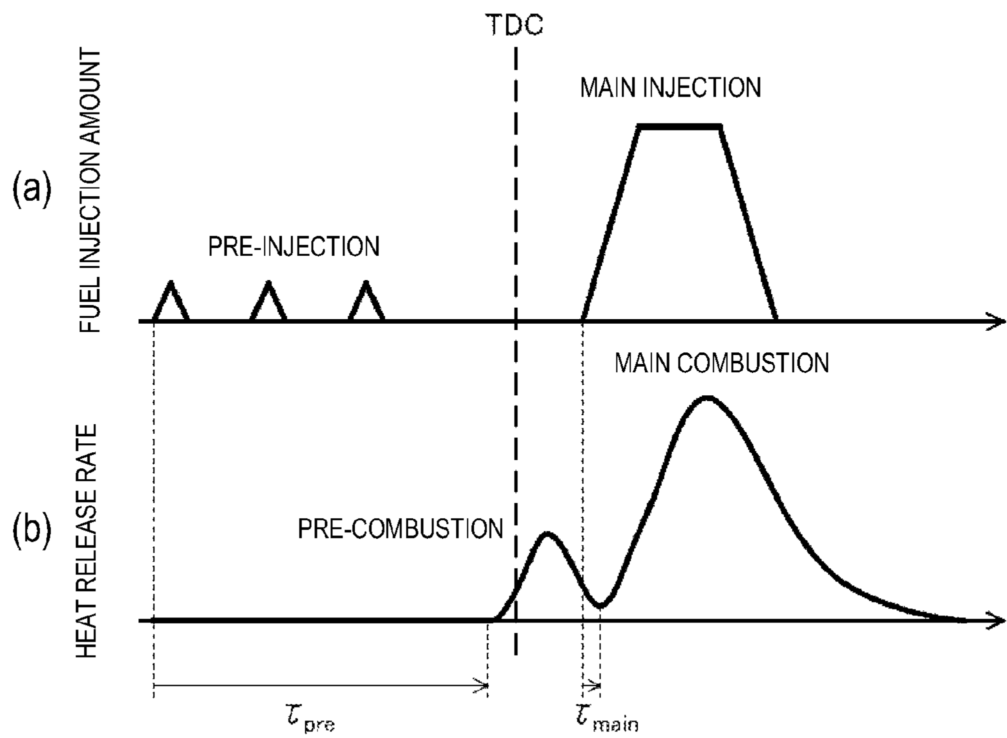
FIG. 9 is charts, in which a part (a) is a chart showing an example of a fuel injection mode within a predetermined operating range different from that of FIG. 3 and a part (b) is a chart showing an example of a history of a heat release rate in cylinders corresponding to the fuel injection mode.

Within an operating range B where the engine load is higher than within the range where the premixed combustion is performed, and lower than within the operating range C, even if the ignitability of the fuel is improved by performing the plurality of pre-injections, because the temperature and the pressure at the end of the compression stroke under motoring are low, the ignition delay $\tau_{pre}$ of the pre-injection cannot sufficiently be shortened, and the peak of the heat release rate of the pre-combustion appears after the TDC in the compression stroke as shown in the part (b) of FIG. 9. Therefore, the ignition delay $\tau_{pre}$ for the main combustion cannot be shortened by setting the injection timing for the main injection near the TDC in the compression stroke similar to the injection mode within the operating range C in FIG. 3, Thus, the timing for the main injection is delayed to be after the TDC in the compression stroke within the operating range B where the ignition delay $\tau_{pre}$ for the pre-combustion is long, as shown in the part (a) of FIG. 9. Here, a crank angle for delaying the main injection may be a predetermined crank angle set in advance.

Figure 10:
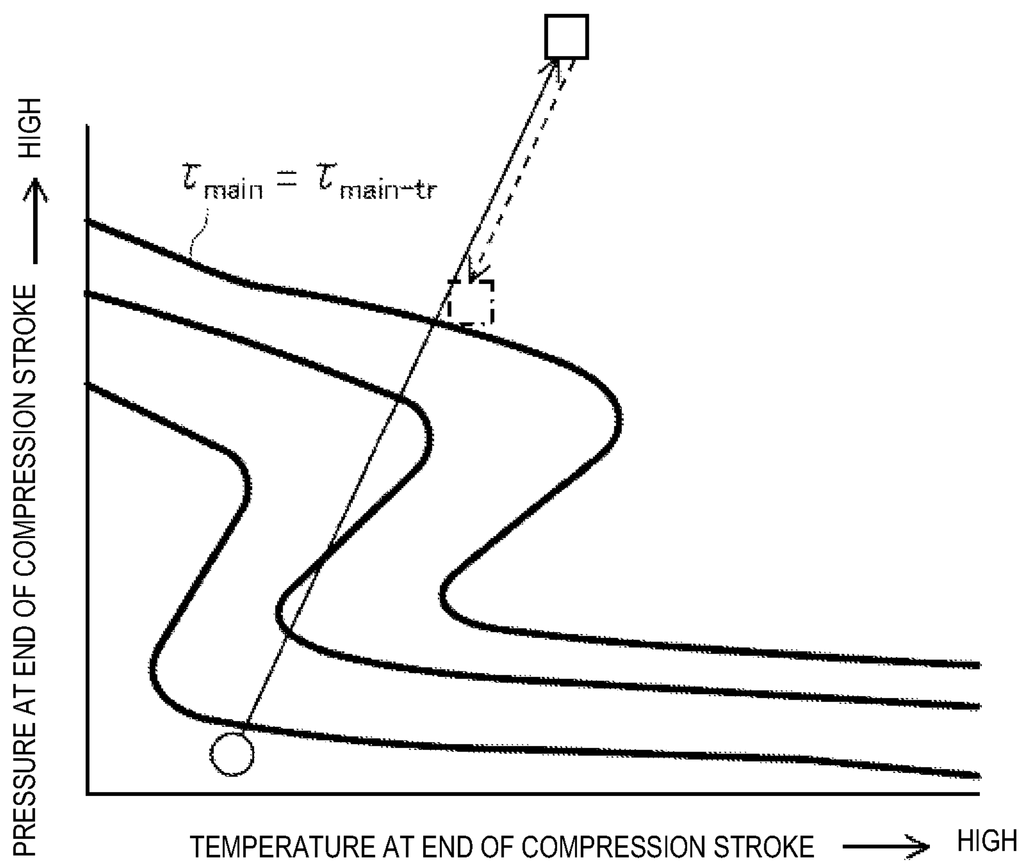
FIG. 10 is a chart showing a function of the pre-injection in the fuel injection mode shown in FIG. 9 by using a contour chart relating to an ignition delay.

Thereby, the ignition delay $\tau_{main}$ for the main combustion reaches the target ignition delay $\tau_{main-tr}$ of between 0.1 to 0.3 msec, and the heat release rate of the main combustion starts to increase after the heat release rate of the pre-combustion starts to decrease at the same time when the heat release rate of the pre-combustion reaches its peak. That is, waveforms of the heat release rates including the pre-combustion and the main combustion are substantially the same between the operating ranges B and C and, thus, become advantageous in improving the NVH performance during the main combustion. The injection amount by the pre-injections within the operating range B may be set based on, for example, the contour chart in FIG. 10. That is, as described above, the ignition delay $\tau_{main}$ at the predetermined timing, after the TDC in the compression stroke is required to be set to the target ignition delay $\tau_{main-tr}$ within the operating range B so that the main combustion starts at the predetermined timing after the TDC in the compression stroke. Meanwhile, during an expansion stroke after the TDC in the compression stroke, the pistons 14 descend and the in-cylinder temperature and pressure gradually decrease. Therefore, the heat amount in the pre-combustion is set in advance (see the solid line white square in FIG. 10) considering the decreases in the in-cylinder temperature and pressure as shown by the break line arrow in FIG. 10. Thereby, the in-cylinder temperature and pressure at the predetermined timing after the TDC in the compression stroke (see the dashed line white square in FIG. 10) can reach the state with the target ignition delay $\tau_{main-tr}$.

Note that, such combustion control may be performed, for example, when the outside air temperature is 0° C. or below, or when the altitude is 1000 m or higher in addition to when the engine 1 is in the non-warmed-up state under a normal condition. The outside air temperature can be detected by an outside air temperature sensor and the altitude can be detected by an altitude sensor. That is, the combustion control may be performed based on the environmental conditions relating to the operation of the engine 1 alternative to performing the control according to the map based on the rotation speed and the load of the engine 1 shown in FIG. 6. Further, the combustion control may be performed under conditions in which the wall temperatures of the cylinders 11*a* are low where the ignitability of the fuel tends to decrease, such as during a transient state when returning from a fuel cut condition, in addition to when under the normal condition of the engine 1.

In controlling the engine 1 by the PCM 10, the contour chart (map) in FIG. 7 relating to the ignition delay may be utilized other than the map in FIG. 6 relating to the operating state of the engine 1. That is, with the contour chart in FIG. 7 stored in the PCM 10 in advance, the in-cylinder temperature and pressure at the end of the compression stroke are estimated based on the parameters of at least the intake air temperature, the intake air pressure (or the atmospheric pressure), the engine coolant temperature, the engine speed and an injection pressure on the fuel acquired from, for example, various sensors, and the injection modes of the pre-injection and the main injection required in realizing the target ignition delay (i.e., $\tau_{main-tr}$) are set based on the contour chart in FIG. 7. Thereby, the pre-injection and the main injection may be performed according to the set injection modes.

Alternative to the control utilizing the contour chart in FIG. 7, a pre-set model statement may be stored in the PCM 10 in advance, and the injection modes of the pre-injection and the main injection required in realizing the target ignition delay may be set based on the model statement using the parameters of at least the intake air temperature, the intake air pressure (or the atmospheric pressure), the engine coolant temperature, the engine speed and the injection pressure on the fuel acquired from, for example, the various sensors. Thereby, the pre-injection and the main injection may be performed according to the set injection modes, By employing the controls utilizing the contour chart or the model statement, when delaying the timing for the main injection (e.g., within the operating range B), the main injection is not delayed uniformly by the predetermined angle set in advance and can be delayed only by an angle corresponding to the ignition delay for the pre-combustion, and, thus, it is advantageous in improving the fuel consumption.

Therefore, in this embodiment, the mixture gas with high equivalence ratio can be generated by dividing the pre-injection fuel amount and performing the pre-injection a plurality of times. As a result, the ignition delay $\tau_{pre}$ for the pre-combustion is shortened (e.g., $\tau_{pre} \leq 1.5$ msec) and the controllability of the pre-combustion can be improved. Specifically, the pre-combustion can be caused with high accuracy so that the peak of the heat release rate is generated at the predetermined timing before the TDC in the compression stroke.

Thereby, the robustness of the main combustion can be improved by improving the controllability of the pre-combustion. That is, the in-cylinder temperature and pressure can be increased in advance near the TDC in the compression stroke, where the main injection is performed, by accurately performing the pre-combustion at the above timing. Particularly, by creating the state in which the peak of the heat release rate of the pre-combustion is generated before the TDC in the compression stroke and the heat release rate is in the process of decreasing near the TDC in the compression stroke, the in-cylinder temperature and pressure near the TDC in the compression stroke can be set in advance to a state appropriate for causing the main combustion without a delay. Thus, the ignition delay $\tau_{main}$ for the main combustion can he set to $0.1 \leq \tau_{main} \leq 0.3$ msec and the main combustion can stably be caused by having the in-cylinder temperature and pressure increased when performing the main injection.

As a result, the controllability of the main combustion can be improved. Specifically, the main combustion can stably he caused at the desired timing. Here, the desired timing is preferably near the TDC in the compression stroke, By starting the main combustion near the TDC in the compression stroke, the combustion energy by the main combustion can be efficiently transmitted to the crank shaft 15 and the fuel consumption can be improved. Further, by shortening the ignition delay, the slope and the peak of the heat release rate of the main combustion can be controlled. For example, by slowing down a fuel injection speed to extend an injecting time period, the slope of the heat release rate can be moderated and the peak of the heat release rate can be lowered, and, as a result, the NVH performance can be improved.

The engine 1 of this embodiment has the relatively low compression ratio in which the geometric compression ratio is within the range of 12:1 to 15:1, and therefore, the temperature and the pressure within the engine 1 under motoring are low. That is, the ignition delay for the main combustion tends to be longer. The temperature and the pressure within the engine I are even lower during the pre-combustion because the pre-combustion is caused before the TDC in the compression stroke, which is disadvantageous in view of the ignition delay. Therefore, performing the plurality of pre-injections at the above described timings is particularly effective in such engine with the low compression ratio.

Note that, the number and the timings of the pre-injections are not limited to the above embodiment, and may appropriately be changed according to, for example, the operating state of the engine 1.

Further, in the above embodiment, the particular combustion control with the combination of the plurality of pre-injections and the main injection is performed when the engine 1 is in the non-warmed-up state or when the glow plugs 19 are stopped; however, the combustion control may further be performed when the engine is in the cold state or an extremely cold state where the glow plugs 19 are operated. In this case, the ignitability of the fuel is further improved by the combination of the glow plugs 19 and the combustion control, and the operation of the glow plugs 19 can be suppressed correspondingly. The control of the glow plugs 19 is advantageous in achieving its longer service life.

As described above, the present invention is effective for the diesel engine with the low compression ratio.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A diesel engine, comprising:

an engine body to be supplied with fuel containing diesel fuel as its main component, a geometric compression ratio being set to 15:1 or below;

a fuel injection valve arranged in the engine body so as to be oriented toward a cylinder of the engine body and for directly injecting the fuel into the cylinder; and a control module for controlling a mode of injecting the fuel into the cylinder through the fuel injection valve;

wherein the control module performs a main injection where the fuel is injected to cause a main combustion mainly including a diffusion combustion and performs a plurality of pre-stage injections where the fuel is injected prior to the main injection to cause a pre-stage combustion prior to the main combustion, where the plurality of pre-stage injections are injected at a timing near top dead center of a compression stroke, and where each of the pre-stage injections is performed at a timing in which injected fuel reaches within a cavity formed in a top surface of a piston fitted in the cylinder, and fuel injected later collides with fuel previously injected, and a gas mixture with a high equivalence ratio is locally generated; and wherein the control module controls the injection mode of the pre-stage injections and the injection mode of the main injection so that a heat release rate of the main combustion starts to increase after a heat release rate of the pre-combustion starts to decrease at the same time when the heat release rate of the pre-combustion reaches a peak.

2. The diesel engine of claim 1, wherein the control module controls the injection modes of the pre-stage injections and the main injection so that the heat release rate of the pre-stage combustion reaches a peak before a top dead center on compression stroke and the main combustion starts near the top dead center on the compression stroke.

3. The diesel engine of claim 1, further comprising a glow plug attached to the cylinder;

wherein, when the engine body is below a predetermined first temperature, the control module further operates the glow plug and, when the engine body is above the first temperature and below a predetermined second temperature, the control module stops the glow plug and performs the plurality of pre-stage injections and the main injection.

4. The diesel engine of claim 1, wherein the control module determines the injection modes of the pre-stage injections and the main injection by using a model for estimating a temperature and a pressure within the cylinder at the end of the compression stroke to calculate an ignition delay based on an operating state of the engine body and environmental conditions relating to the operation of the engine body.

5. The diesel engine of claim 1, wherein the control module determines the injection modes of the pre-stage injections and the main injection by using a map representing a relation between a state of a temperature and a pressure within the cylinder at the end of the compression stroke and an ignition delay under the state of the temperature and the pressure based on an operating state of the engine body and environmental conditions relating to the operation of the engine body.

6. A diesel engine, comprising:

an engine body to be supplied with fuel containing diesel fuel as its main component, a geometric compression ratio being set to 15:1 or below;

a fuel injection valve arranged in the engine body so as to be oriented toward a cylinder of the engine body and for directly injecting the fuel into the cylinder; and a control module for controlling a mode of injecting the fuel into the cylinder through the fuel injection valve;

wherein the control module performs a main injection where the fuel is injected to cause a main combustion mainly including a diffusion combustion and performs a plurality of pre-stage injections where the fuel is injected prior to the main injection to cause a pre-stage combustion prior to the main combustion, where the plurality of pre-stage injections are injected at a timing near top dead center of a compression stroke, and where each of the pre-stage injections is performed at a timing such that injected fuel reaches to a region within a cavity formed in a top surface of a piston fitted in the cylinder, and fuel injected later collides with fuel previously injected, and as a result a gas mixture with a high equivalence ratio is locally generated; and wherein the control module controls the injection mode of the pre-stage injections and the injection mode of the main injection so that, by increasing a temperature and a pressure within the cylinder by the pre-stage combustion, an ignition delay from a start of the main injection to a start of the main combustion becomes within a range of 0.1 to 0.3 msec.

7. The diesel engine of claim 6, wherein the control module controls the injection modes of the pre-stage injections and the main injection so that the heat release rate of the pre-stage combustion reaches a peak before a top dead center on compression stroke and the main combustion starts near the top dead center on the compression stroke.

8. The diesel engine of claim 6, further comprising a glow plug attached to the cylinder;

wherein, when the engine body is below a predetermined first temperature, the control module further operates the glow plug and, when the engine body is above the first temperature and below a predetermined second temperature, the control module stops the glow plug and performs the plurality of pre-stage injections and the main injection.

9. The diesel engine of claim 6, wherein the control module determines the injection modes of the pre-stage injections and the main injection by using a model for estimating the temperature and the pressure within the cylinder at the end of the compression stroke to calculate the ignition delay based on an operating state of the engine body and environmental conditions relating to the operation of the engine body.

10. The diesel engine of claim 6, wherein the control module determines the injection modes of the pre-stage injections and the main injection by using a map representing a relation between a state of the temperature and the pressure within the cylinder at the end of the compression stroke and the ignition delay under the state of the temperature and the pressure based on an operating state of the engine body and environmental conditions relating to the operation of the engine body.

11. A method of controlling a diesel engine having a cylinder to be directly supplied with fuel containing diesel fuel as its main component, a geometric compression ratio being set to 15:1 or below, comprising:

when the engine is in a predetermined operating state, performing a main injection to cause a main combustion mainly including a diffusion combustion and a pre-stage injection to cause a pre-stage combustion prior to the main combustion;

determining an injection mode of the pre-stage injection and an injection mode of the main injection so that a heat release rate of the main combustion starts to increase after a heat release rate of the pre-combustion starts to decrease at the same time when the heat release rate of the pre-combustion reaches a peak;

performing the pre-stage injection for a plurality of times during a compression stroke according to the determined injection mode, the pre-stage injections being injected at a timing near top dead center of the compression stroke, and each of the pre-stage injections being performed at a timing such that injected fuel reaches to a region within a cavity formed in a top surface of a piston fitted in the cylinder and fuel injected later collides with fuel previously injected, and as a result a gas mixture with a high equivalence ratio is locally generated; and performing the main injection after the pre-stage injection according to the determined injection mode.

12. A method of controlling a diesel engine having a cylinder to be directly supplied with fuel containing diesel fuel as its main component, a geometric compression ratio being set to 15:1 or below, comprising:

when the engine is in a predetermined operating state, performing a main injection to cause a main combustion mainly including a diffusion combustion and a pre-stage injection to cause a pre-stage combustion prior to the main combustion;

determining an injection mode of the pre-stage injection and an injection mode of the main injection so that, by increasing a temperature and a pressure within the cylinder by the pre-stage combustion, an ignition delay from a start of the main injection to a start of the main combustion starts becomes within a range of 0.1 to 0.3 msec;

performing the pre-stage injection for a plurality of times during a compression stroke according to the determined injection mode, where the pre-stage injections are injected at a timing near top dead center of the compression stroke, and where each of the pre-stage injections is performed at a timing in which injected fuel reaches to a region within a cavity formed in a top surface of a piston fitted in the cylinder and fuel injected later collides with fuel previously injected, and as a result a gas mixture with a high equivalence ratio is locally generated; and performing the main injection after the pre-stage injection according to the determined injection mode.

* * * * *